(12) United States Patent
Kim et al.

(10) Patent No.: US 8,504,832 B2
(45) Date of Patent: Aug. 6, 2013

(54) MOBILE TERMINAL FOR SHARING RESOURCES, METHOD OF SHARING RESOURCES WITHIN MOBILE TERMINAL AND METHOD OF SHARING RESOURCES BETWEEN WEB SERVER AND TERMINAL

(75) Inventors: Seung Hyun Kim, Daejeon (KR); Dae Seon Choi, Daejeon (KR); Soo Hyung Kim, Daejeon (KR); Jong Hyouk Noh, Daejeon (KR); Sang Rae Cho, Daejeon (KR); Young Seob Cho, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 55 days.

(21) Appl. No.: 13/189,352

(22) Filed: Jul. 22, 2011

(65) Prior Publication Data
US 2012/0054492 A1    Mar. 1, 2012

(30) Foreign Application Priority Data
Aug. 27, 2010    (KR) .................... 10-2010-0083662

(51) Int. Cl.
*H04L 29/06* (2006.01)
*H04L 9/32* (2006.01)
(52) U.S. Cl.
USPC ........................... 713/168; 713/150; 713/171
(58) Field of Classification Search
None
See application file for complete search history.

(56) References Cited

U.S. PATENT DOCUMENTS

| 7,031,945 B1 * | 4/2006 | Donner ........................ 705/64 |
| 7,596,533 B2 * | 9/2009 | Szabo et al. .................. 706/11 |
| 8,009,829 B2 * | 8/2011 | Jueneman et al. ............. 380/28 |

OTHER PUBLICATIONS

Secure Cookies on the Web; Authors: Joon S. Park, Ravi Sandhu Journal IEEE Internet Computing; vol. 4 Issue 4, Jul. 2000 p. 36-44.*
Dos and don'ts of client authentication on the web Authors: Kevin Fu, Emil Sit, Kendra Smith, Nick Feamster; 2001 Article Proceeding SSYM'01 Proceedings of the 10th conference on USENIX Security Symposium—vol. 10; pp. 1-24; year 2001.*

* cited by examiner

*Primary Examiner* — David Y Jung

(57) ABSTRACT

Provided are a mobile terminal for sharing resources, a method of sharing resources within a mobile terminal and a method of sharing resources between a web server and a terminal. The mobile terminal for sharing resources includes a web browser using a web standard protocol to display a first random value, an authentication number, and a Distinguished Name (DN) of web server transferred from the web server after it has been determined that there is no key information in a cookie; and a resource when the first random value and the DN are received from the web browser, being terminated after storing the first random value and the DN, and when the resource is re-executed and the authentication number is input by a user, verifying the first random value, generating a second random value and a shared key from the first random value and generating a symmetric key using a part of the shared key, wherein the shared key is generated from the second random value based on the symmetric key, and the symmetric key is identical to a symmetric key of the web server generated from a part of the symmetric key, and the web browser and the resources are operated by an execution unit.

14 Claims, 4 Drawing Sheets

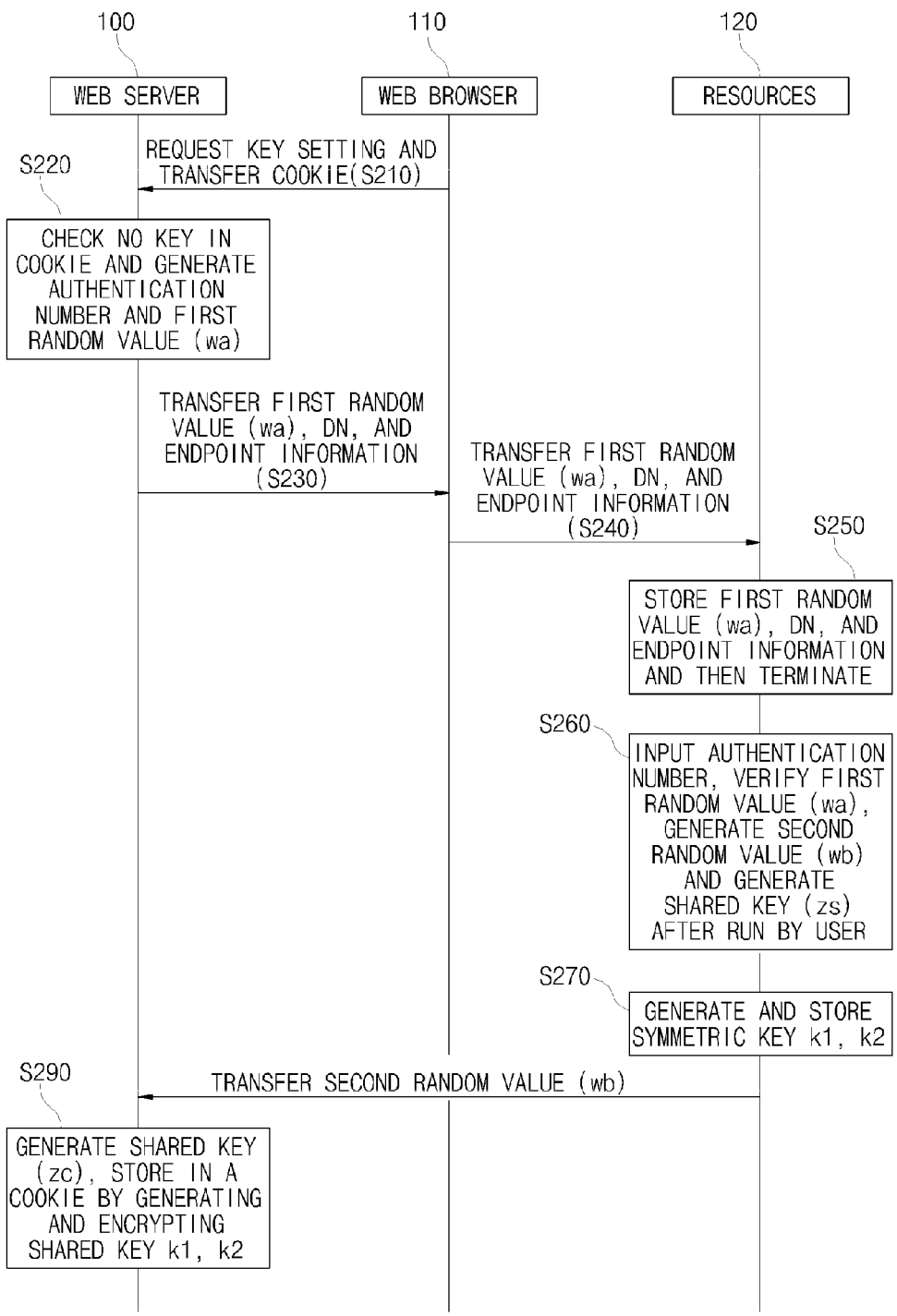

FIG. 3

```
.ᴏ□□    AM1:15    ✱ 93% ▭▭
┌─────────────────────────┐
│    SHOPPING MALL WEB    │
├─────────────────────────┤
│ SITE NAME               │
│ ┌─────────────────────┐ │
│ │ G MARKET            │ │
│ └─────────────────────┘ │
│ ENDPOINT INFORMATION    │
│ ┌─────────────────────┐ │
│ │ www.gmarket.co.kr   │ │
│ └─────────────────────┘ │
│ PLEASE, EXECUTE         │
│ SMART-SIGN APP AND INPUT│
│ NEXT NUMBER             │
│ ┌─────────────────────┐ │
│ │ 12345               │ │
│ └─────────────────────┘ │
│      ┌────OK────┐       │
│      └──────────┘       │
└─────────────────────────┘
```

FIG. 4

```
.ᴏ□□    AM1:15    ✱ 93% ▭▭
┌─────────────────────────┐
│   SMART-SIGN KEY SETTING│
├─────────────────────────┤
│ SITE NAME               │
│ ┌─────────────────────┐ │
│ │ G MARKET            │ │
│ └─────────────────────┘ │
│ ENDPOINT INFORMATION    │
│ ┌─────────────────────┐ │
│ │ www.gmarket.co.kr   │ │
│ └─────────────────────┘ │
│ DO YOU ACCEPT TO USE    │
│ ELECTRONIC SIGNATURE    │
│ FUNCTION OF SMART-SIGN IN│
│ ABOVE SITE?             │
│                         │
│ IF YOU ACCEPT, PLEASE,  │
│ INPUT AUTHENTICATION    │
│ NUMBER PROVIDED FROM    │
│ ABOVE SITE              │
│ ┌─────────────────────┐ │
│ │ 12345               │ │
│ └─────────────────────┘ │
│      ┌────OK────┐       │
│      └──────────┘       │
└─────────────────────────┘
```

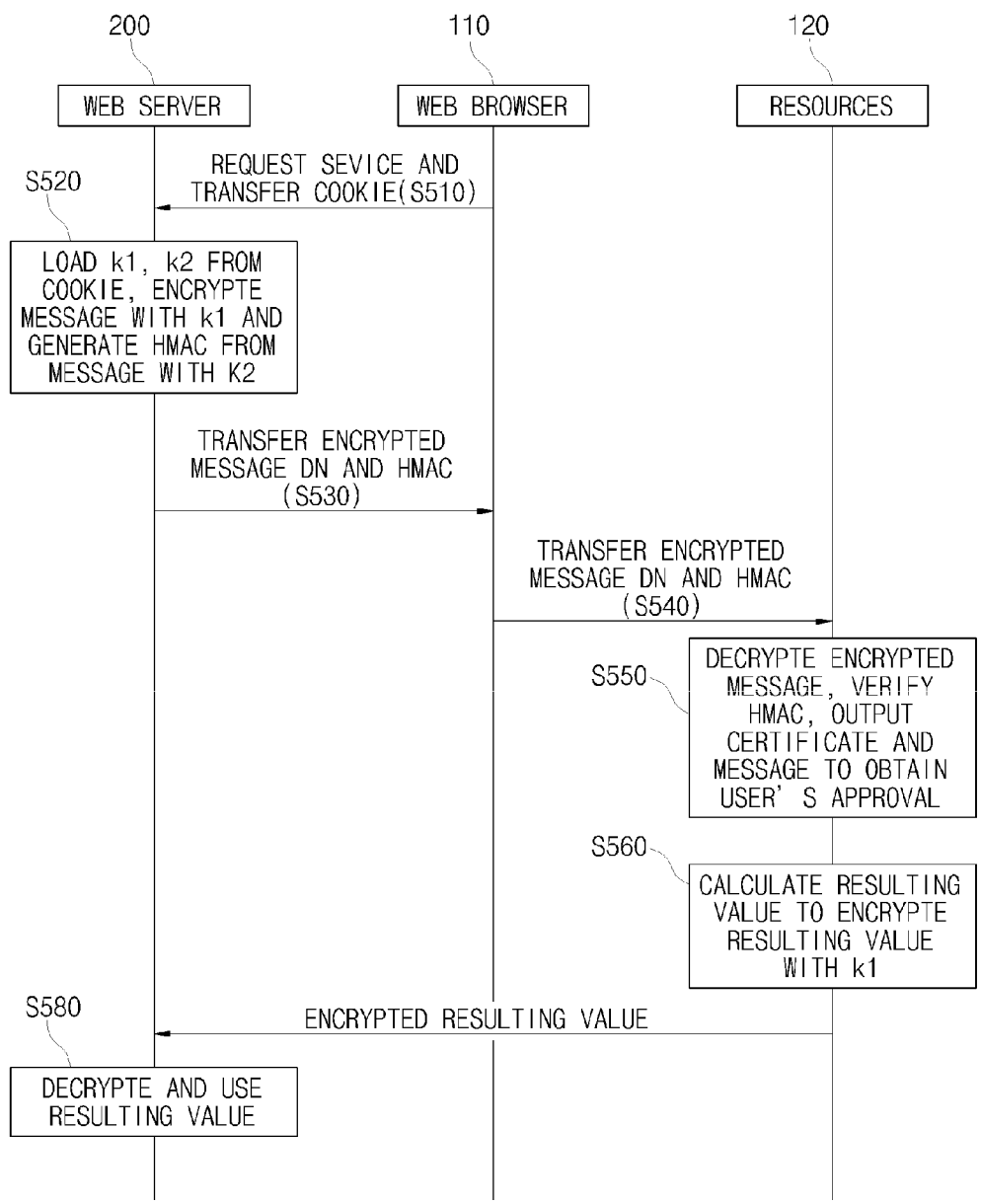

MOBILE TERMINAL FOR SHARING RESOURCES, METHOD OF SHARING RESOURCES WITHIN MOBILE TERMINAL AND METHOD OF SHARING RESOURCES BETWEEN WEB SERVER AND TERMINAL

CROSS-REFERENCE TO RELATED APPLICATIONS

This application claims priority under 35 U.S.C. §119 to Korean Patent Application No. 10-2010-83662, filed on Aug. 27, 2010, in the Korean Intellectual Property Office, the disclosure of which is incorporated herein by reference in its entirety.

TECHNICAL FIELD

The present invention relates to a method of sharing resources, and more particularly, to a mobile terminal for sharing resources, which calls resources through a web browser using web standard protocols, a method of sharing resources within a mobile terminal and a method of sharing resources between a web server and a terminal.

BACKGROUND

Conventionally, local resources are shared using plug-in functions of web browser or dedicated web browser in mobile environment.

Related art methods of sharing resources can arbitrarily access to and alter local resources, and cannot be controlled by a web browser. Therefore, the related art methods cannot be implemented using a standard web browser due to problem in security, and there is a burden in developing a separate web browser for each operation system.

Furthermore, in the related art methods of sharing resources, an attack by a phishing site that calls any local resources and acquires personal information may occur, and it is possible to alter messages between a web server and a user web browser or steal their roles, thereby causing weakness in security.

In addition, such a risk exists similarly even in the case where a malignant web browser is installed and used within a terminal, so that countermeasures are required.

SUMMARY

An exemplary embodiment of the present invention provides a mobile terminal for sharing resources that includes: a web browser using a web standard protocol to display a first random value, an authentication number, and a Distinguished Name (DN) of web server transferred from the web server after it has been determined that there is no key information in a cookie; and a resource when the first random value and the DN are received from the web browser, being terminated after storing the first random value and the DN, and when the resource is re-executed and the authentication number is input by a user, verifying the first random value, generating a second random value and a shared key from the first random value and generating a symmetric key using a part of the shared key, wherein the shared key is generated from the second random value based on the symmetric key, and the symmetric key is identical to a symmetric key of the web server generated from a part of the symmetric key, and the web browser and the resources are operated by an execution unit.

Another exemplary embodiment of the present invention provides a method of sharing resources within a mobile terminal, in which the mobile terminal equipped with one or more resources and a web browser using a web standard protocol shares the resources with a web server, the method including: when the web server generates a first random value and an authentication number and transfers them along with a Distinguished Name (DN) to the web browser after it is determined that there is no key information in a cookie, displaying the authentication number, the first random value and the DN on the web browser; storing, by the resources, the first random value, and the DN and being terminated when the first random value and the DN are received from the web browser; verifying, by the resources, the first random value when the authentication number is input by a user; and generating, by the resources, a second random value and a shared key from the first random value, then generating a symmetric key using a part of the shared key and transferring the second random value to the web server.

Still another exemplary embodiment of the present invention provides a method of sharing resources within a mobile terminal that includes: when a service is requested by a web browser, reading a symmetric key from a cookie of the web browser, encrypting a message and calculating a Hash-based Message Authentication code (HMAC) by a web server; transferring the encrypted message and the HMAC to the web browser and calling the resources through the web browser; and verifying, by the resources, the encrypted message and the HMAC using the symmetric key, performing a process requested by the message, and transferring a resulting value of the process.

Other features and aspects will be apparent from the following detailed description, the drawings, and the claims.

BRIEF DESCRIPTION OF THE DRAWINGS

FIG. 2 illustrates a flow chart showing a key exchange method according to an exemplary embodiment of the present invention;

FIG. 3 illustrates the screen of a mobile terminal of step S230;

FIG. 4 illustrates the screen of a mobile terminal of step S260; and

FIG. 5 illustrates a flow chart showing security communication between the mobile terminal and a web server according to an exemplary embodiment of the present invention.

DETAILED DESCRIPTION OF EMBODIMENTS

Figure 1:
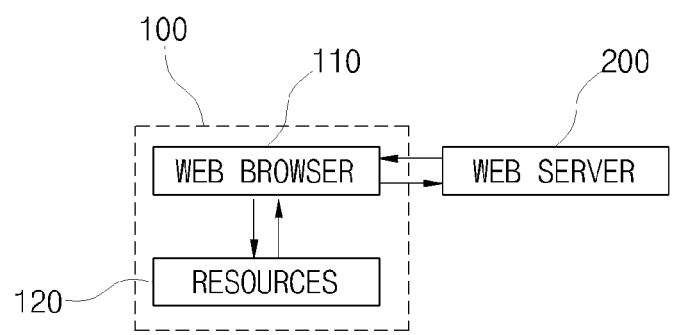
FIG. 1 illustrates the configuration of a system for sharing resources according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The exemplary embodiments of the present invention are described in detail below.

FIG. 1 illustrates the configuration of a system of sharing sources according to an exemplary embodiment of the present invention.

As shown in FIG. 1, the system of sharing resources according to the exemplary embodiment of the present invention includes a mobile terminal 100 and a web server 200.

The mobile terminal 100 includes a web browser 110 and one or more resources 120.

The web browser 110 is performed by a user and requests desired web services to a web server 200 corresponding to an inputted address when the address of the web server 200 is input.

In this case, the web browser 110 cooperates with resources 120 without a separate plug-in and communicates with the web server 200 using a web standard protocol (HTTP, HTTPS etc.)

When receiving a request for the performance of a function provided by the resources 120 from the web server 200, the web browser 110 transfers at least one parameter of an identifier endpoint of the web server 200, the requested function and signature information to the resources 120.

The resources 120 verifies at least one parameter transferred from the web browser 110, then performs the requested function, and transfers a result value by the performance of the function to the endpoint of the web server 200, for example, a HTTP Redirect shame.

The resources 120 include application programs running on the mobile terminal 100 or application execution units (for example, central processing unit and memory, etc.).

That is, the resources 120 may be programs running in the state of off-line without HTTP.

For example, the resources 120 may be programs for managing certificates which transfer public key certificates stored in the state of off-line in the mobile terminal 100 to other resources, or perform signature using the public key certificates.

The web server 200 provides web services to the mobile terminal 100 through the web browser 110, and cooperates with and uses the resources 120 through the web browser 110.

In this case, the web server 200 may provide web services through HTTP (HyperText Transfer Protocol) or HTTPS (Hypertext Transfer Protocol over Secure Socket Layer) channel.

Hereinafter, a method for key exchange between the web server and the resources according to an exemplary embodiment of the present invention will be described with reference to FIGS. 2 through 4. FIG. 2 is a flowchart showing the method for key exchange according to the exemplary embodiment of the present invention, FIG. 3 illustrates the screen of the mobile terminal in step S230, and FIG. 4 illustrates the screen of the mobile terminal in step S260.

Referring to FIG. 2, when the web browser 110 is run according to a user's request, the web browser 110 transfers cookie information to the web server 200 (S210).

The web server 200 determines whether predefined security information (for example, key information) exists within the cookie information, if there is no security information, enters key exchange services and generates an authentication number and a first random value wa (S220).

Subsequently, the web server 200 transfers resources information, the first random value wa, a Distinguished Name (DN), a screen display name and endpoint information to the web browser 110. The web browser 110 displays the screen display name, the endpoint information and the authentication number as shown in FIG. 3 (S230). In this case, the endpoint information may be the address of the web server 200 or the address of another server accessed through the web server 200.

The web browser 110 calls the resources 120 and transfers the first random value wa, the DN, the screen display name and the endpoint information (S240).

The resources 120 store the first random value wa, the DN, the screen display name and the endpoint information transferred from the web browser 110 and is then terminated (S250).

Thereafter, when a user directly operates the resources 120, checks the DN and directly inputs the authentication number checked at the step S230, the resources 120 verify the first random value, generate a second random value using the first random value and, generate a shared key zs based on the second random value using a first algorithm (S260).

The resources 120 generate two symmetric keys k1 and k2 using a part of the shared key zs and stores the symmetric keys k1 and k2 along with the DN of the web server 200 (S270).

Furthermore, the resources 120 transfer the second random value wb to the web server 200 (S280).

Then, the web server 200 generates a shared key zc based on the second random value using a second algorithm, and generates the symmetric keys k1 and k2 using a part of the shared key zc (S290).

In this case, the web server 200 and the resources 120 previously define scheme for generating the symmetric keys k1 and k2 based on the shared key.

The web server 200 encrypts the symmetric keys k1 and k2 as the key kws of the web server 200, and stores them in the cookie (S300). That is, the web server 200 prevents any other devices which don't know the key kws from decoding the symmetric keys from the cookie by encrypting and storing the symmetric keys k1 and k2, and need not to be equipped with a separate storage.

In this case, the web server 200 and the resources 120 of the mobile terminal of the present invention generate the shared key using different algorithms, thereby resulting in advantages in security.

A method for sharing resources between the mobile terminal and the web server according to an exemplary embodiment of the present invention is described below with reference to FIG. 5. FIG. 5 illustrates a flowchart showing the method for sharing resources between the mobile terminal and the web server according to the exemplary embodiment of the present invention.

In FIG. 5, a case in which the web server 200 requests a message signature service for the mobile terminal 100 is taken as an example.

Referring to FIG. 5, the web server 200 calls the keys k1 and k2 from the cookie transferred along with the request for the service, encrypts the message with the key k1 and calculates a HMAC (Hash-based Message Authentication code) from the message using the key k2 (S520) when the service is requested through the web browser (S510). In this case, the web server 200 may decrypt the keys k1 and k2 from the cookie using kws.

Next, the web server 200 transfers information on the resources, the DN, the encrypted message and the HMAC to the web browser 110 (S530).

The web browser 110 calls the resources 120 and transfers the DN, the encrypted message, and the HMAC (S540).

The resources 120 load the keys k1 and k2 from a storage using the DN, decrypt the encrypted message with k1 and verify the HMAC with k2. Furthermore, the resources 120 display the DN and the message on the screen of the mobile terminal 100 and receive overt approval from a user for the web server 200 (S550).

In this case, the resources 120 decrypt the encrypted message with k1 and verify the HMAC using k2, thereby verifying the identity of the web server 200 and the identity of the resources 120.

Subsequently, the resources 120 sign on the message, then encrypts the signed message with k1 (S560) and returns the encrypted message to the web server 200 through the web browser 110 (S570).

Thereafter, the web server 200 decrypts the returned message using k1 and uses it for predetermined purpose (S580).

In summary, when the web browser 110 requests a service requiring message signature, the web server 200 encrypts a message to be signed and transmits it through the web browser 110. The resources 120 decrypt and sign the message and transfer it to the web server 200 via the web browser 110. The web server 200 receives the signed message and uses it for verification, etc.

As described above, in the present invention, the web server 200 shares the resources with the mobile terminal 100, and the web server 200 and the mobile terminal 100 transmit and receive the encrypted message using the symmetric keys k1 and k2, thereby ensuring security on the message.

In addition, the web server may share the resources with the mobile terminal through a web browser using a standard web protocol without a separate plug-in.

Furthermore, the present invention verifies the identity of the web server and cryptographically communicates with the verified web server using the symmetric key, thereby taking advantages in message security.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal for sharing resources comprising:
 a web browser using a web standard protocol to display a first random value, an authentication number, and a Distinguished Name (DN) of web server transferred from the web server after it has been determined that there is no key information in a cookie; and
 a resource when the first random value and the DN are received from the web browser, being terminated after storing the first random value and the DN, and when the resource is re-executed and the authentication number is input by a user, verifying the first random value, generating a second random value and a shared key from the first random value and generating a symmetric key using a part of the shared key,
 wherein the shared key is generated from the second random value based on the symmetric key, and the symmetric key is identical to a symmetric key of the web server generated from a part of the symmetric key, and
 the web browser and the resources are operated by an execution unit.

2. The mobile terminal of claim 1, wherein the web server and the resource generate the shared key using different algorithms.

3. The mobile terminal of claim 1, wherein the web server uses the web standard protocol to also display an endpoint information.

4. The mobile terminal of claim 1, wherein, when the web server transmits a message encrypted with the symmetric key and a Hash-based Message Authentication Code (HMAC) calculated from the symmetric key, the resources decrypt the message encrypted with the symmetric key and verify an identity of the web server by verifying the HMAC.

5. A method of sharing resources within a mobile terminal, in which the mobile terminal, equipped with one or more resources and a web browser using a web standard protocol, shares the resources with a web server, the method comprising:
 when the web server generates a first random value and an authentication number and transfers them along with a Distinguished Name (DN) to the web browser after it is determined that there is no key information in a cookie, displaying the authentication number, the first random value and the DN on the web browser;
 storing, by the resources, the first random value, and the DN and being terminated when the first random value and the DN are received from the web browser;
 verifying, by the resources, the first random value when the authentication number is input by a user; and
 generating, by the resources, a second random value and a shared key from the first random value, then generating a symmetric key using a part of the shared key and transferring the second random value to the web server.

6. The method of claim 5, wherein the web server and the resources generate the shared key using different algorithms.

7. The method of claim 5, wherein the web server uses the web standard protocol to also display an endpoint information.

8. The method of claim 5, further comprising generating, by the web server, the shared key from the second random value, generating the symmetric key using a part of the shared key and securely communicating with the mobile terminal.

9. The method of claim 5, wherein, the displaying includes transferring and displaying endpoint information of the web server and a screen display name of the web server, and the being terminated includes storing the endpoint information of the web server and the screen display name of the web server.

10. A method of sharing resources within a mobile terminal, comprising:
 when a service is requested by a web browser, reading a symmetric key from a cookie of the web browser, encrypting a message and calculating a Hash-based Message Authentication code (HMAC) by a web server;
 transferring the encrypted message and the HMAC to the web browser and calling the resources through the web browser; and
 verifying, by the resources, the encrypted message and the HMAC using the symmetric key, performing a process requested by the message, and transferring a resulting value of the process.

11. The method of claim 10, further comprising verifying an identity of the web server by verifying the HMAC calculated from the message using the symmetric key.

12. The method of claim 10, wherein the resources generate the symmetric key by using a part of a shared key based on a random value using a first algorithm and wherein the web server generates the shared key based on the random value using a second algorithm.

13. The method of claim 10, wherein the HMAC is calculated from the message using a part of the symmetric key.

14. The method of claim 10, wherein verifying the encrypted message and the HMAC comprises:
  decrypting, by the resources, the encrypted message with a symmetric key k1; and
  verifying, by the resources, the HMAC with a symmetric key k2.

* * * * *